United States Patent [19]
Petrucci

[11] 3,954,624
[45] May 4, 1976

[54] FILTER CARTRIDGE ASSEMBLY
[75] Inventor: Raymond M. Petrucci, Middlebury, Conn.
[73] Assignee: AMF Incorporated, White Plains, N.Y.
[22] Filed: Apr. 17, 1974
[21] Appl. No.: 461,562

[52] U.S. Cl.............................. 210/439; 210/440; 210/444
[51] Int. Cl.² ........................................ B01D 27/00
[58] Field of Search ............. 55/316, 502; 210/234, 210/235, 439–454, 516, DIG. 23

[56] References Cited
UNITED STATES PATENTS

| | | | |
|---|---|---|---|
| 3,319,791 | 6/1967 | Horne | 210/234 |
| 3,741,400 | 6/1973 | Dick | 210/516 |
| 3,832,141 | 8/1974 | Haldopoulos | 210/DIG. 23 |

Primary Examiner—Charles N. Hart
Assistant Examiner—Richard W. Burks
Attorney, Agent, or Firm—George W. Price; Martin Smolowitz

[57] ABSTRACT

A filter cartridge assembly having a unitary cartridge body with a protuberance extending therefrom. The protuberance is designed to sealably fit into a fixed connection disposed between the inlet and outlet portions of the fluid stream. The protuberance is provided with a first sealing member in the form of a feathered edge seal adapted to seal the cartridge inlet and outlet fluid streams respectively. Another seal spaced beneath the feathered seal in the form of an "O" ring serves as a frictional seal between the top of the cartridge body and the fixed connection. An annular fluid stream passage formed between the interior wall surface of the fixed connection and the protuberance, allows the cartridge body to be urged into the connection without regard to orientation of inlet or outlet fluid stream passages.

7 Claims, 3 Drawing Figures

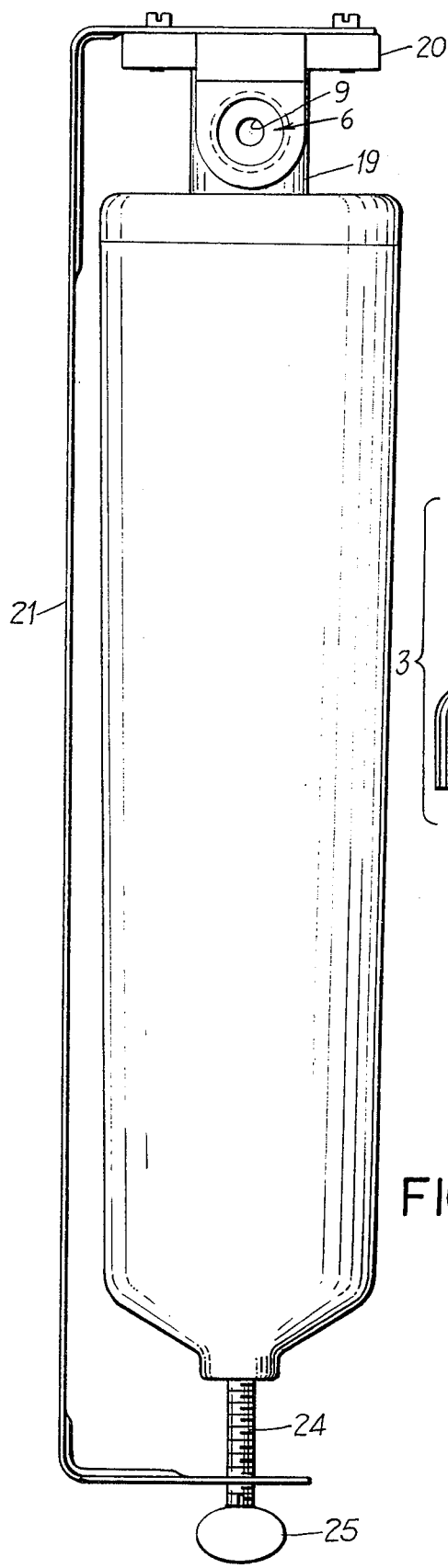
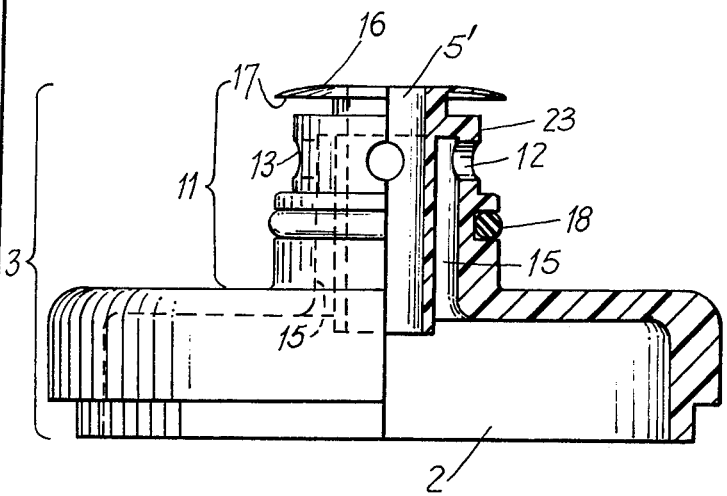
FIG. 2
FIG. 3

FILTER CARTRIDGE ASSEMBLY

The present invention is directed to a filter, and a filter cartridge assembly. More particularly to an arrangement whereby a cartridge is provided with an upper portion readily adapted to be positioned into a mating section having inlet and outlet passages therein. The filter is designed to remove dirt, tastes and odors and to prevent scale build up.

The use of cartridges containing filter media for in-line applications is well known. Once the cartridge has been fully spent it remains for the user to remove such cartridge and replace it with the fresh one. In many applications such as for use with vending machines, it is desirable to employ a quick, efficient and easy to operate arrangement for the removal of spent and insertion of fresh cartridges. The prior art has considered this problem and has provided an approach often more complicated than the present invention.

For example, U.S. Pat. No. 3,746,171 employs an assembly with a clamping collar which engages the cartridge head only when specifically positioned to correctly support the entire filter assembly. This particular arrangement necessitates use of a cam mechanism so that the cartridge head and associated clamping collar need to be oriented with respect to one another to cause the filter unit to properly seal with the head. Removal of the cartridge is achieved by the application of a rotational force in the opposite direction to effectuate disengagement.

The present invention on the other hand, has sought to provide an arrangement capable of being utilized without the need for time consuming cartridge orientation device which have been found difficult to maneuver for proper positioning prior to placement of such cartridge into operation.

Accordingly, it is the object of the present invention to overcome the defects of the prior art.

It is still another object of the present invention to provide a simple and efficient in-line cartridge assembly assuring ease of cartridge removal for replacement and positive disposition when locked in place.

Still another object of the present invention is to provide a filter cartridge assembly having associated therewith an upper portion with a tubular section requiring only axial alignment with a mating section of the top of the cartridge assembly when cartridge replacement is necessary.

Still another object of the present invention is to provide a filter cartridge assembly having a minimum number of parts and being relatively inexpensive to manufacture.

The principal feature of the present invention is directed to an elongated cylindrical chamber having: filter media disposed therein; closure means affixed to the top portion of said chamber; fluid stream connecting means disposed in said fluid stream line, having integrally formed inlet and outlet ports; said fluid stream connecting means being adapted to be cooperatively positioned with respect to said cylindrical chamber; cartridge connecting means integrally formed of said closure means for positioning said cylindrical chamber containing said filter media in cooperative working relationship with said fluid stream connecting means; tubular means disposed within said cylindrical chamber, being in communication with said cartridge connecting means for allowing the passage of fluid therethrough and into said outlet port in said fluid stream connecting means; passage means formed by said fluid connecting means for allowing the passage of fluid into said chamber interior; first sealing means affixed to said cartridge connecting means extending in a radial direction, serving to seal the inlet and outlet fluid streams passing through said fluid stream connecting means; said first sealing means being defined by a feathered edge portion having associated therewith an undercut surface further defining a passage between said cartridge connecting means and said fluid stream connecting means to allow the passage of fluid into the inlet port of said cartridge connecting means, said undercut surface serving to provide additional dynamic force on said first sealing means to further enhance sealing at the contact surfaces between said first sealing means and said fluid stream connecting means; second sealing means disposed beneath said first sealing means serving to provide frictional sealing between said fluid stream connecting means and said closure means; central passage means formed in said closure means connected to said tubular portion, and extending into and through said cartridge connecting means to thereby form an outlet passage means from the interior of said cylindrical chamber to and through the outlet port of said fluid stream connecting means; and fluid inlet passage means extending from an inlet passage in said cartridge connecting means to the chamber interior allowing the passage of inlet fluid through to the chamber interior.

Also within the scope of the invention is closure connecting means defined by a centrally disposed protuberance integrally formed of said closure means, having a central passage formed therein being connected to said tubular means at one end; the upper surface of said protuberance forming a feathered edge seal, the outer edges of which provide sealing action between the inlet and outlet fluid streams each of which respectively passes below and above said feathered edge seal.

The above objects and advantages of the invention will become more apparent when considered with reference to the accompanying drawings in which like reference characters refer to like portions throughout the several views and in which drawings:

FIG. 2 is an end view of the filter assembly identified in FIG. 1.

FIG. 3 is a partial cross-sectional view of the upper section of the cartridge.

Figure 1:
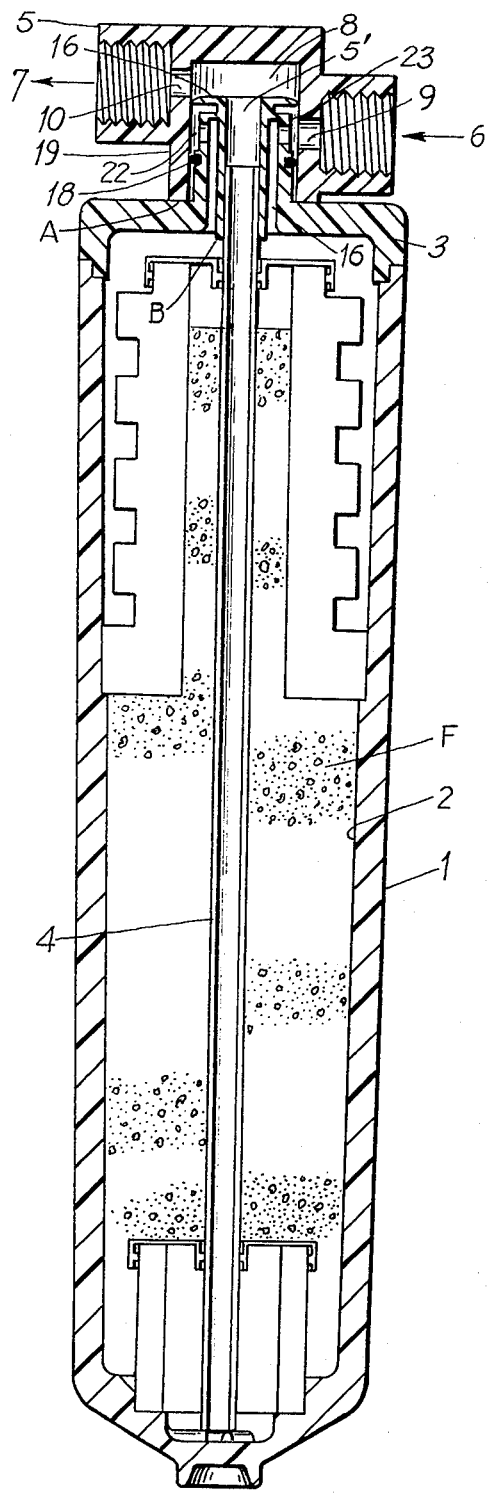
FIG. 1 is a partial cross-sectional view of the filter and the filter cartridge assembly in the locked position to the upper head.

Fluid flow proceeds into the filter cartridge in a generally known manner with the fluid entering from inlet port passing through filter media and is caused to flow upward through a tubular member and out of the cartridge. A feathered sealing edge to be described hereinafter, separates the outlet from the inlet portions. An "O" ring is additionally provided to prevent leakage between a cartridge top and upper portion of the cartridge casing.

In accordance with FIG. 1 the cartridge assembly includes a cartridge case 1 having an internal substantially elongated chamber 2 for the placement of suitable filter media F. Disposed at the top of such case and serving to seal the case 1 at its upper section is an integral closure portion 3. A centrally disposed tubular member 4 extends axially within the chamber 2 and is connected to the closure portion 3 to form a unitary structure with such chamber 2 via the internal passage 5'. For operation, the cartridge casing 1 is caused to be positioned in a passage 8 provided in member 5. Such member 5 is provided with an inlet opening 6 and an outlet opening 7 extending therefrom, which openings are in parallel relation, offset with respect to one another, and are suitably threaded to allow for attachment to appropriate connections. The passage 8 is connected to openings 6, 7 via inlet port 9 and an outlet port 10. The closure 3 includes an integrally formed protuberance 11 extending therefrom, being centrally disposed thereon and shaped to closely fit into passage 8, as well as, to function in a manner to be described hereinafter.

More particularly, as shown in FIG. 3, the protuberance 11 includes inlet flow orifices 12, 13 in communication with a central passage 15 leading into chamber 2 for receiving and directing the flow of fluid into the filter media within the chamber 2. As the fluid is treated within the chamber 2 it proceeds to ultimately flow downward through the filter media F and outward via tube 4 through passage 5' and exits via outlet 7. A feathered edge seal 16 is provided to assure positive sealing between the inlet and outlet fluid streams. The seal 16 extends in a radial direction and engages the interior wall surfaces of passage 8 to thereby separate the inlet and outlet fluid passages. Added sealing action by the edge seal 16 with respect to passage 8 is effectuated by the transmission of inlet flow forces on the undersurface of the seal causing seating of the edge 16 against the wall passage 8. By forming the feathered seal with a recess such as undersurface 17, the sealing action is further amplified. In effect, there is triple action sealing by the feathered edge seal 16. The protuberance 11 is further provided with an "O" ring 18 disposed at a point beneath the pair of inlet orifices 12, 13 which "O" ring serves as a frictional seal between the member 5 and casing 1 as the protuberance is urged into passage 8.

A recessed portion 22 of protuberance 11 serves to form an annular flow path defined by wall surface 23 of protuberance 11 and an interior surface of wall passage 8. The path so formed serves as an inlet passage and extends from inlet port 9 through passage 15 and into the interior of chamber 2. As a result of this arrangement, one can achieve proper sealing by merely positioning the cartridge assembly protuberance 11 into the passage 8 in a manner allowing elongated portion 19 of member 5 to communicate with the upper surface of closure portion 3 at point A. In accordance with the invention, the requirement to orient the inlet port with any internal orifice or passage is not necessary for cartridge operation. Fluid entering the inlet opening 6 will be caused to travel into the cartridge interior as previously described and pass through tube 4 for exit out of outlet port 7.

As shown in FIG. 2, the cartridge assembly is held in place by a flange 20 integrally formed of the member 5 connected to a "C" shaped bracket 21. The lower portion of chamber 2 includes a threaded member 24 for receiving such bracket 21 and is adjustable therewith i.e. thumbscrew 25.

The present invention contemplates an alternate embodiment which can include a non-integrally formed seal between the inlet and outlet fluid streams in the form of an "O" ring instead of the feathered edge seal 16. Obviously, such "O" ring seal would be properly disposed with respect to the protuberance 11, and caused to seat in a recess at the upper section of the protuberance 11.

Having disclosed a present embodiment of the invention, it will be understood that various modifications and changes may be made which come within the scope of the annexed claims.

What I claim:

1. A filter cartridge assembly including: an elongated cylindrical chamber; filter media disposed therein; closure means affixed to the top portion of said chamber; fluid stream connecting means disposed in said fluid stream line having integrally formed inlet and outlet stream ports; said fluid stream connecting means being adapted to be cooperatively positioned with respect to said cylindrical chamber; cartridge connecting means integrally formed of said closure means for positioning said cylindrical chamber containing said filter media in cooperative working relationship with said fluid stream connecting means; tubular means disposed within said cylindrical chamber, being in communication with said cartridge connecting means for allowing the passage of fluid therethrough and into said outlet port in said fluid stream connecting means; passage means formed by said fluid connecting means for allowing the passage of fluid into said chamber interior; first sealing means affixed to said cartridge connecting means extending in a radial direction serving to seal the inlet and outlet fluid streams passing through said fluid stream connecting means; said first sealing means being defined by a feathered edge portion having associated therewith a flat undercut surface further defining a passage between said cartridge connecting means and said fluid stream connecting means to allow the passage of fluid into the inlet port of said cartridge connecting means, said undercut surface serving to provide additional dynamic force on said first sealing means to further enhance sealing at the contact surfaces between said first sealing means and said fluid stream connecting means; second sealing means disposed beneath said first sealing means serving to provide frictional sealing between said fluid stream connecting means and said closure means; central passage means formed in said closure means connected to said tubular portion and extending into and through said cartridge connecting means to thereby form an outlet passage means from the interior of said cylindrical chamber to and through the outlet port of said fluid stream connecting means; and fluid inlet passage means extending from an inlet passage in said cartridge connecting means to the chamber interior allowing the passage of inlet fluid through to the chamber interior.

2. A filter cartridge assembly as claimed in claim 1, wherein: said cartridge connecting means is defined by a centrally disposed protuberance integrally formed of said closure means, having a central passage formed therein and connected to said tubular means at one end; the upper surface of said protuberance forming a feathered edge seal, the outer edges of which provide sealing action between the inlet and outlet fluid streams each of which respectively passes below and above said feathered edge seal.

3. A filter cartridge assembly as claimed in claim 1, wherein: said feathered edge seal is defined by a radially extending body portion integrally formed of said cartridge connecting means having an upper sloping surface in the radial direction merging with a lower extending surface at a edge portion, which edge portion provides the sealing action at the point of communication with the interior wall surface of said fluid stream connecting means.

4. A filter cartridge assembly as claimed in claim 1, wherein: said fluid stream connecting means is provided with an extending body portion having a central passage means therethrough adapted to receive and cooperatively act with said cartridge connecting means, as said cartridge connecting means is urged into said passage means until the lower surface of said body portion of said fluid stream connecting means is in communication with the upper surface of said closure means.

5. A filter cartridge assembly as claimed in claim 2, wherein: said cylindrical chamber is provided with cartridge connecting means insertable into said fluid stream connecting means by urging said protuberance into the passage within said fluid stream connecting means, thereby causing said protuberance to form an annular fluid passage beneath said feathered edge seal, said annular flow passage being defined by a longitudinal wall surface of said protuberance and a parallel interior surface of said fluid stream connecting means.

6. A cartridge body for use with a filter cartridge assembly in a fluid stream including: a chamber for the placement of filter media; a tubular member centrally disposed within said chamber; closure means sealing said chamber; cartridge connecting means disposed on said closure for connection into a fluid stream, said connecting means being provided with a protuberance extending therefrom, defined by first sealing means in the form of an integral sloping radiating portion having a cooperating flat undersurface of sufficient thickness and extending to meet with the edge portion of said radiating surface to thusly form a feathered sealing edge; a centrally disposed fluid outlet passage extending into said tubular member and through into the interior of said chamber; a plurality of fluid inlet orifices disposed below said first sealing means extending about the periphery of a recessed portion of said protuberance, being connected to an annular inlet passage formed interior of said protuberance; and second sealing means defined by an "O" ring positioned about said protuberance.

7. A cartridge connecting means as claimed in claim 6, wherein such cartridge connecting means is integrally formed with a filter cartridge casing adapted to be used with a cooperating connecting member disposed in a fluid stream and having respective inlet and outlet ports; said cooperating member being provided with a recepticle including passage means for directing the outlet fluid stream from said chamber through to said outlet port; said recepticle being further provided with an interior wall surface adapted to form a positive fluid seal with said first sealing means and a friction seal with said second sealing means after said protuberance is urged into said recepticle.

* * * * *